United States Patent [19]

Ewing

[11] Patent Number: 4,706,357

[45] Date of Patent: Nov. 17, 1987

[54] VALVE SERVICING TOOL

[76] Inventor: James T. Ewing, 11096 57th Rd., North, Royal Palm Beach, Fla. 33411

[21] Appl. No.: 797,621

[22] Filed: Nov. 13, 1985

[51] Int. Cl.[4] .............................................. B23P 19/04

[52] U.S. Cl. .................................................. 29/213 R

[58] Field of Search .............. 29/213 R, 213 E, 221.5; 137/15, 315, 317, 327; 251/319

[56] References Cited

U.S. PATENT DOCUMENTS

| | | | |
|---|---|---|---|
| 184,686 | 11/1876 | Miller | 137/318 |
| 249,526 | 11/1881 | Hubbell | 137/318 X |
| 435,193 | 12/1981 | Anderson | 29/213 |
| 906,158 | 12/1908 | Raymond . | |
| 2,343,146 | 2/1944 | Jenkins | 50/23 |
| 2,647,419 | 8/1953 | Dickason | 29/213 |
| 2,687,903 | 8/1954 | Zeeb | 251/319 X |
| 3,148,690 | 9/1964 | Petersen | 137/15 |
| 3,561,090 | 11/1968 | Fritch | 29/213 |
| 3,576,195 | 4/1971 | Richard, Jr. | 137/317 |
| 3,840,967 | 10/1974 | Olson | 29/213 |
| 3,935,713 | 2/1976 | Olson | 62/77 |
| 4,324,270 | 4/1982 | Mullins | 137/317 |

FOREIGN PATENT DOCUMENTS

| | | | |
|---|---|---|---|
| 590569 | 4/1959 | Italy | 29/213 |
| 1057179 | 2/1967 | United Kingdom | 29/213 |
| 371388 | 8/1973 | U.S.S.R. | 137/327 |

*Primary Examiner*—Robert C. Watson
*Attorney, Agent, or Firm*—Steele, Gould & Fried

[57] ABSTRACT

A tool is provided for repairing valve elements in pressurized systems having a valve stem and a valve core. A block member has a passage therethrough at which a valve stem engagement structure is affixed. A slide member is dovetailed to slide along the block member. The slide member also has a passage therethrough such that in one sliding position of the slide member relative to the block member the respective passages align to allow a tool to be passed through the slide member, block member, and valve stem engagement structure to service the valve. When the passages are misaligned, the passage through the block member is substantially sealed from gas leakage by abutment with the dovetail-attached slide member.

19 Claims, 4 Drawing Figures

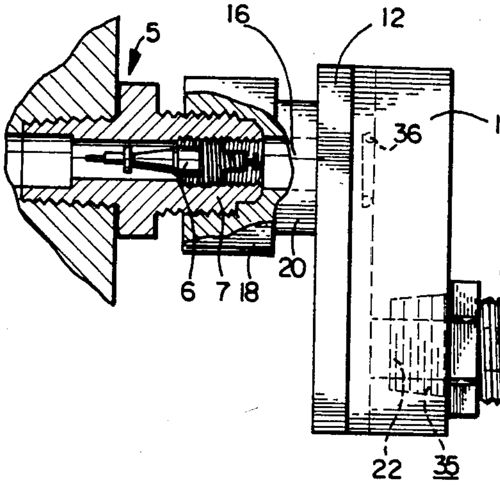
FIG. 1
FIG. 4
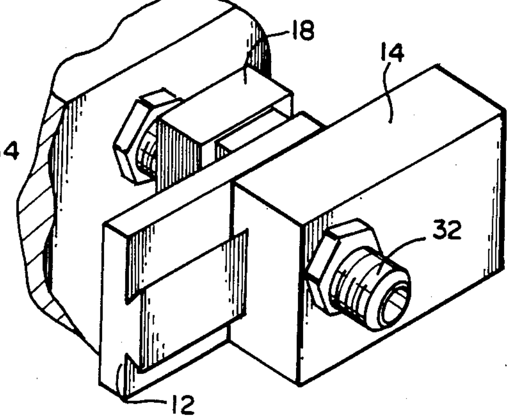
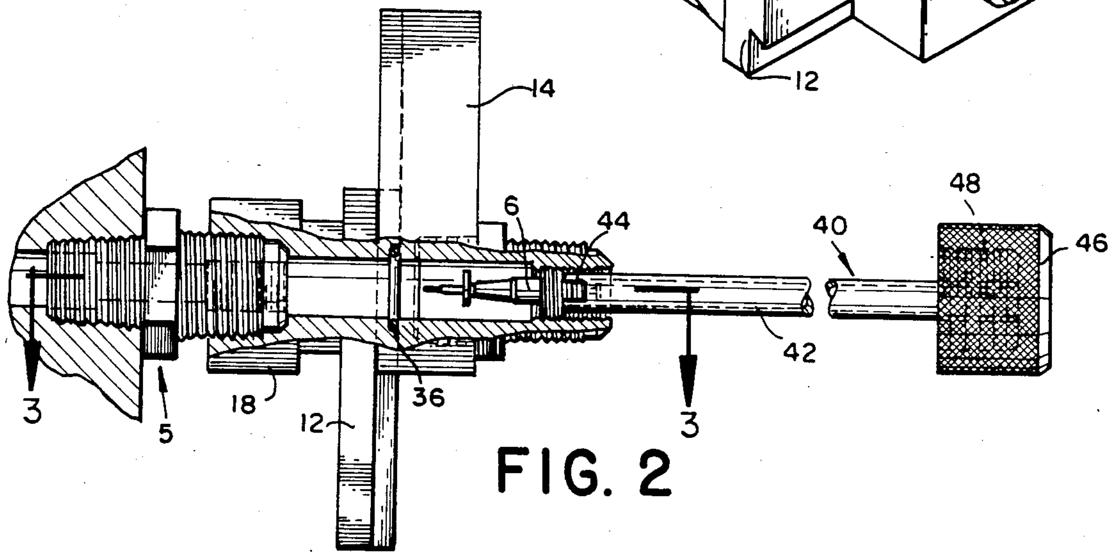
FIG. 2
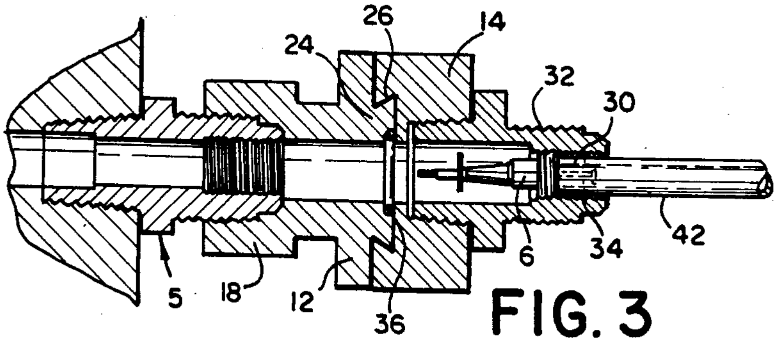
FIG. 3

VALVE SERVICING TOOL

BACKGROUND OF THE INVENTION

1. Field of the Invention

This invention relates generally to a tool for repairing valve elements, and particularly to a tool useful for repairing valve elements in pressurized systems.

2. Description of the Prior Art

It is desirable to have the ability to repair valve elements in pressurized systems, and particularly to remove and replace or service the threadably mounted valve core in pressurized refrigeration systems or the like, without depressurizing the system by removing or losing the refrigerant gas. The pressures most often encountered in such systems vary from 75 lbs./sq. in. to 250 lbs./sq. in. The valve cores and thread sizes etc. are standardized, making it possible to attach a standard tool to the valve fitting, through which the valve core can be passed, after which the passage through the tool is closed. A good sealing mechanism is crucial to maintain pressure when the core is removed, and the need to open an access way to the core complicates matters. Such needs, together with the substantial operating pressures make it necessary to provide a device of great precision as well as very sturdy construction. The tools which have been heretofore known for this purpose have been of relatively complicated construction, making them prone to leak, and/or less dependable and thus expensive to manufacture than necessary.

Fritch, U.S. Pat. No. 3,561,090, discloses a valve core changing tool with a carousel arrangement of relatively rotatable elements with eccentric around the bolt, which is parallel to the valve system. In one rotatable position the old valve core can be removed through an eccentric passageway in the aligned elements with a tool, and in another carousel position the new valve core can be installed.

Olson, U.S. Pat. No. 3,840,967, discloses a tool for servicing a pressurized refrigeration system or the like. Structure is provided to sealably engage the refrigeration system at the valve stem. The valve core is removed with an internally carried tool that is manipulated from the outside but kept in a sealed area to prevent gas leakage. A cutoff valve in the tool seals the pressurized system from the area such that the valve core can then be removed and serviced or, by reversing the procedure, replaced.

Anderson, U.S. Pat. No. 4,305,193, discloses a tool for servicing valves in pressurized systems which provides a pulling device carried in a bore through a block, rotatably mounted in a housing. In one block position, the bore in the block aligns with the valve to allow access and removal of the core therefrom. By rotation the block around an axis perpendicular to the valve stem to a position in which the bore and valve are axially misaligned, the valve is sealed from the bore such that the valve core can be removed from the bore by the block and serviced or replaced. The block is spherical or cylindrical and is sealably captive in the housing. The block and housing must fit tightly around the round contour of the block to prevent gas leakage.

The present invention provides a tool for servicing or replacing valve elements in pressurized systems which can be relatively easily and inexpensively manufactured yet is of a very sturdy construction. The tool can withstand the extreme pressures which can be encountered in refrigeration systems and the like by virtue of a slidable dovetail interlocking system between tool components. The dovetail prevents any loosening that would occur with eccentric-passage bolt-connected elements as in Fritch. The dovetail also improves the seal without need for precisely-matched round parts as in the block and housing of Anderson. The tool of the invention therefore combines effectiveness, durability, safety and economy.

SUMMARY OF THE INVENTION

It is an object of the invention to provide a valve servicing tool providing sealable access for removal of a valve core, which can readily seal and withstand substantial pressures, at least as great as encountered in refrigeration systems, and which will continue to do so over a long useful life.

It is another object of the invention to provide a valve servicing tool which can be inexpensively manufactured yet is at least as effective as more expensive tools.

It is still another object of the invention to provide a valve servicing tool which is easy to use.

It is yet another object of the invention to provide a valve servicing tool which is compact in design and characterized by flat sliding surfaces.

These and other objects are accomplished by a valve servicing tool which includes a block member having a passage therethrough and valve stem engagement means affixed to the block member and having a passage aligned with the passage through the block member. A slide member is slideably engaged to the block member and also has a passage. In one sliding position of the slide member relative to the block member, the respective passages align, whereupon a tool is passed therethrough to service the valve. In another sliding position of the slide member, the respective passages are not aligned and the passage through the block member is effectively sealed by the slide member.

The block member and slide member are joined by interengaged dovetail structure. The structure is characterized by flat sliding surfaces providing linear sliding movement of the slide member relative to the block member. These flat surfaces can be very accurately and easily formed, for example by machining.

The valve stem is threaded and the engagement means for the stem is preferably a nut bearing internal threads. The nut is mounted to the block member such that the user can affix the tool to the valve stem with an open end wrench. The nut may be rotatably mounted on the block member, or may be rigidly affixed. The nut is mounted to a hollow shaft affixed to the block member. For rotation, the shaft may have a flared end making the nut captive on the shaft.

O-rings may be provided to seal component interfaces from gas leakage. An O-ring is especially useful to seal the block member passage at its juncture with the slide member.

A valve core engagement device for reaching through the aligned block and slide includes an elongated shaft with valve-core engagement structure at one end and a manually-engageable enlargement at the opposite end. The shaft is passed through the aligned passages to effect either removal or replacement of a valve core.

An internally threaded fitting may be provided at the outlet of the slide member passage. This fitting preferably takes the form of a standard refrigeration access valve, which includes external threads. The internal threads are used to retain a loosened valve core during removal or replacement, when the valve core is unthreaded from the valve stem of the pressurized system. The external threads allow attachment of the tool to additional structure and also can be used to secure the valve core engagement device to the rest of the tool for convenient storage.

To remove and replace the valve core, the user attaches the tool to the valve stem, aligns the block and slide, and reaches through to loosen the core with the engagement device, pressure then forcing the core outwards. The core is threaded (from behind) into the internally threaded slide member outlet. The passages in the block and slide are then misaligned by sliding the block and slide relative to one another, sealing the system. The user threads the core entirely through the internal threads and removes it. The new core is installed by reversing the process.

BRIEF DESCRIPTION OF THE DRAWINGS

There is shown in the drawings embodiments which are presently preferred. It should be understood, however, that the invention is not limited to the precise arrangements and instrumentalities shown, and further that the features of the invention as shown and claimed are subject to various combinations and groupings.

FIG. 1 is a side elevation of a tool according to the present invention, partially broken away.

FIG. 2 is a side elevation of a tool according to the present invention, partially broken away, positioned for valve servicing or repair.

FIG. 3 is a cross section taken along the line 3—3 in FIG. 2.

FIG. 4 is a perspective view of the tool, shown attached to a valve stem.

DESCRIPTION OF THE PREFERRED EMBODIMENTS

Referring to FIG. 1, a tool according to the present invention is used to service a valve 5. The valve is a standardized fitting known in the art, and has a valve core 6 threadably engaged in an internally-threaded valve stem 7. The tool includes a block member 12 and a slide member 14, which are slidable but are affixed to one another by interengaging slidable structure characterized by cooperating tongue and groove portions, such as an elongated dovetail mortise and tenon. The block member 12 has a passage 16 therethrough. The passage 16 should be a bore of a diameter sufficient to permit the removal of the valve core 6 or other element to be serviced and is preferably laterally centered and located adjacent one end of the block member 12, spaced from the longitudinal center.

The block member 12 has valve engagement means provided at the outlet of the passage 16. The valve engagement means preferably includes a nut 18, which may be rotatably secured to a hollow shaft portion 20 which is affixed at the outlet of the passage 16 by suitable means such as welding. The nut 18 may be retained on the hollow shaft portion 20 by the provision of suitable structure such as a flared end portion on the hollow shaft 20, allowing rotation of the nut relative to the shaft. Alternatively, the nut can be rigidly affixed to the shaft, requiring rotation of the tool to thread nut 18 on stem 7. The hollow internal portions of nut 18 and shaft 20 align with the aperture 16 so as to provide a straight passage clear through. The nut 18 has suitable structure for engaging a valve stem such as internal threading which cooperates with external threading on the valve stem.

The slide member 14 is slideably engaged to the block member 12 through interlocking structure formed in the slide member 14 and the block member 12. This interlocking structure is preferably of a dovetail design and includes a tongue 24 formed in the block member 12 and which is slideably engaged to a groove 26 formed in the slide member 14 (see FIG. 3). The tongue 24 is securely held but longitudinally moveable along the groove 26 such that the slide member 14 may be longitudinally and preferably linearly moved relative to the block member 12. While a particular dovetail engagement structure is described, it is of course within the spirit of the invention to modify this structure to other forms of slide locked interengagement as will now be apparent to one skilled in the art. For example, the respective shapes of the tongue and groove may be modified from the traditional dovetail shape. Also, the tongue and groove structure may be reversed such that the tongue is fashioned on the slide member 14 while the groove is fashioned on the block member 12. A tongue and groove structure having a tongue and a groove on opposite sides of the block may be used as well.

The slide member 14 is provided with a passage 22 therethrough. The passage 22 is a bore of a diameter at least as large as a maximum diameter of the valve core 6. Passage 22 is preferably located in the lateral center of the slide member 14 and at a longitudinal position sustantially opposite the passage 16 through the block member 12, i.e., on the other side of the longitudinal center. A fitting 30 is preferably provided at the outlet of the passage 22 on the side of the slide member 14 opposite the block member 12, the operation of which will be described. The fitting 30 is preferably in the form of a standard refrigeration fitting as is known in the art. That is, it is a hollow fitting with external threading 32 and internal threading 34. The fitting 30 may include an internally extending hollow attachment portion 35 which threadably or otherwise engages the slide member 14. The fitting 30 may alternatively be affixed to the slide member 14 by means known in the art such as welding. The axis of the hollow center of the fitting 30 is aligned with the axis of the passage 22, defining a straight line opening.

It is desirable to provide O-rings at suitable junctures in the tool to prevent gas leakage. An O-ring 36 is provided at the opening of the block member passage 16 at its juncture with the slide member 14. the O-ring 36 prevents gas leakage from the space between the block member 12 and the slide member 14, and seals the juncture between the block member passage 16 and the slide member passage 22. When the block and slide are aligned O-ring 36 confines pressure to the passage. When misaligned, the O-ring seals the passage of block 12 closed, at the surface of slide 14. The O-ring may be positioned in a suitable indented groove formed around the opening of the block member passage 16. The O-ring 36 should project outwardly slightly from the surface of the block member 12, however, so that it securely presses against the slide member 14 to form a tight seal therebetween. The O-ring 36 thereby also biases the block member 12 and the slide member 14 against their respective engagement structure to provide a tightly interfitted tool. Other O-rings could be provided at suitable locations as will now be apparent to one skilled in the art.

A valve core removal device 40 is provided and includes an elongated shaft 42 bearing core engagement structure 44 at one end and a manually-engageable handle 46 at the other end. The core engagement structure 44 is generally U-shaped in cross-section, the "U" structure defining a wrench that endwise engages around a tab-like axial extension of the valve core. Rotation of the elongated shaft 42 when engaging the valve core rotates the valve core and effects removal. The handle 46 is affixed to the other end of the shaft 42 and provides for a firm grip on the tool. The handle 46 may be knurled and may include internal threads 48 which can be used to threadably engage the external threads 32 on the fitting 30 to secure the core removal device to the tool for storage or transportation as a compact unit.

It is contemplated that a tool according to the invention would be constructed from materials which are consistent with the pressure conditions and gases with which the device is used. It is preferable in a high pressure application to construct the device from a quality stainless steel. For lower pressure and less-demanding applications such as changing cores in auto tires, a plastic material will suffice.

The dimensions of the device may vary within the spirit of the invention. By way of example only and not to be construed as limiting in any manner, one embodiment of the invention would have a block member approximately $1\frac{1}{2}'' \times 1'' \times \frac{1}{2}''$ and a slide member $1\frac{1}{2}'' \times \frac{3}{4}'' \times \frac{1}{2}''$. The valve core removal tool may have a shaft length of approximately 2 $\frac{1}{2}$ inches, which provides a conveniently-manipulated device.

The operation of the device begins with the block member 12 affixed to the valve stem and slideably oriented relative to the slide member 14 such that their respective passages 16 and 22 are not aligned (FIG. 1). The passage 16 in the block member 12 is then sealed by O-ring 36, which abuts against the slide member 14 at the end of passage 16. The nut 18 is screwed or otherwise engaged to the valve 5 sufficient to make a gas-tight connection. The slide member 14 is then slideably positioned by the user so as to align the passages 16 and 22, the passages defining a straight line access to valve core 6. The valve core engagement device 40 is then passed through the aligned passages until the valve core engagement structure 44 at the end of device 40 engages the protruding tab end of valve core 6. The valve core 6 is then threadably removed from the valve stem by rotation of the handle 46, whereupon the gas pressure behind the valve core 6 forces it along the aligned passages 16, 22 to the fitting 30. The valve core 6 then engages from behind against internal threads 34 of the fitting 30 whereby it is prevented from escaping from the device. Abutment of the valve core 6 with the interal threads 34 of the fitting 30 also prevents gas leakage through the passage 22. The slide member 14 is then slideably positioned such that the passages 16 and 22 no longer align and the block member passage 16 is in sealing abutment with the face of the slide member 14. The pressurized system is now sealed from the atmosphere, and the valve core 6 is cut off from the pressurized system. The valve core 6 may then be safely removed from the fitting 30 with only minimal loss of gas from the system by threading it entirely through the internal threads of the fitting 30.

The valve core 6 may be repaired or replaced and returned to the system by first placing the repaired or replacement valve core in the fitting 30 and threadably passing it through the internal threads 34. The passage 16 should remain sealed by abutment with the face of the slide member 14. The slide member 14 is then slideably positioned such that the respective passages 16 and 22 once again align. Pressure from the system then is exerted in the passage 22 and on the valve core 6, which remains securely within the fitting 30 due to the presence of the internal threads 34 of the fitting 30. The valve core 6 is then pushed by the user through the aligned passages with the valve core engagement device 40. The valve core 6 is then threadably secured to the valve stem 7. The nut 18 may then be threadably disengaged from the valve stem to remove the tool from the system and complete the procedure.

The presence of the external threads 32 on the fitting 30 allows the attachment of additional components to the device in rapid and easy succession. The fitting 30 is connected to the system and alternately pressurized or depressurized by the simple manipulation of the slide member 14. Testing or servicing equipment is easily attached or changed by using the device as a valve, and the system is isolated when the fitting 30 is isolated, i.e., when slide 14 and block 12 are misaligned. The testing or servicing equipment can subsequently be operatively connected with the pressurized system by repositioning the slide member 14.

This invention may be embodied in other specific forms without departing from the spirit or essential attributes thereof, and accordingly, reference should be made to the appended claims rather than to the foregoing specification, as indicating the scope of the invention.

I claim:

1. A tool for access to pressurized systems having a valve stem and a valve core therein, comprising:

a block member having a first passage therethrough;

engagement means affixed to the block member and operative to engage the valve stem and connect the first passage to the valve stem; and, a slide member securely engaged to the block member and linearly slidable relative to the block member as so engaged, the block member and the slide member engaging one another through cooperating tongue and groove portions preventing displacement of the block member away from the slide member, the slide member having a second passage therethrough alignable with the first passage, the slide member and the block member being movable between one sliding position in which the respective passages align to define a straight opening extending to the valve core, and a second sliding position wherein the first and second passages are misaligned and the first passage is substantially sealed from the atmosphere by abutment with the slide member.

2. The tool of claim 1, wherein the tongue and groove portions define an interfitting dovetail mortise and tenon structure on the block member and the slide member, whereby the block member and the slide member are positively affixed to one another regardless of pressure variation in said passages.

3. The tool of claim 1 wherein the engagement means comprises a rotatable nut adapted to engage external threads on the valve stem.

4. The tool of claim 1 further comprising a hollow fitting at an outlet of the second passage on a side of the slide member opposite the block member.

5. The tool of claim 4, wherein the fitting includes internal threads for threadably receiving the valve core, the internal threads being disposed along said straight opening, whereby the threads prevent sudden ejection of the valve core.

6. The tool of claim 5 wherein the fitting is a standard refrigeration fitting having external threads for receiving standard refrigeration devices.

7. The tool of claim 1 further comprising an O-ring mounted between the block member and the slide member at opening of the first passage facing the slide member.

8. The tool of claim 1 further comprising a valve core removal device having an elongated shaft, the shaft having a wrench structure dimensioned to engage the valve core at one end of the shaft, and a handle at an opposite end of the shaft, the tool being adapted for insertion through the first and second passages when aligned and removal of the valve core.

9. The tool of claim 8 wherein the wrench structure is substantially U-shaped in cross section.

10. A tool for accessing pressurized systems having a valve stem and a valve core, comprising:

an elongated block member having a first transverse passage therethrough;

a female valve stem engagement means affixed to the block member at the transverse passage;

an elongated slide member having a second transverse passage, one of the block member and the slide member having a dovetail mortise and the other having a dovetail tenon, the block member and the slide member being locked together by the mortise and tenon and relatively slidable, the first and second transverse passages being alignable to define a through passage to the valve stem, and misalignable whereupon the first passage is substantially sealed from the atmosphere by abutment with the slide member.

11. The tool of claim 10 wherein the valve stem engagement means comprises a rotatable nut adapted to engage external threads on the valve stem.

12. The tool of claim 10 further comprising a hollow fitting on the slide member at an outlet of the second passage opposite the block member.

13. The tool of claim 12 wherein the fitting includes external and internal threads.

14. The tool of claim 13 wherein the fitting is a standard refrigeration fitting resembling the valve stem.

15. The tool of claim 9 further comprising an O-ring seal mounted on the block member at an end of the first transverse passage facing nearest the slide member.

16. The tool of claim 10 further comprising valve core removal device with an elongated shaft, valve core engagement wrench at one end, and a handle at the other end, the tool being adapted for insertion through the aligned passages and removal of a valve core.

17. The tool of claim 16 wherein the valve core engagement wrench is substantially U-shaped in cross section.

18. The tool of claim 10, wherein the through passage defined by the first and second transverse passages is straight, and further comprising internal threads in the passage for receiving external threads on the valve core, whereby said threads prevent sudden ejection of the valve core from said through passage.

19. A tool for access to pressurized systems having a valve stem and a valve core therein, comprising:

a block member having a first passage therethrough;

engagement means affixed to the block member and operative to engage the valve stem and connect the first passage to the valve stem; and, a slide member securely engaged to the block member and linearly slidable relative to the block member as so engaged, the slide member having a second passage therethrough alignable with the first passage, the slide member and the block member being movable between one sliding position in which the respective passages align to define a straight opening extending to the valve core, and a second sliding position wherein the first and second passages are misaligned and the first passage is substantially sealed from the atmosphere by abutment with the slide member, the straight opening extending to the valve core including internal threads for threadably receiving the valve core, whereby the internal threads prevent sudden ejection of the valve core.

* * * * *